United States Patent
Wang

(10) Patent No.: US 10,634,962 B2
(45) Date of Patent: Apr. 28, 2020

(54) MANUFACTURING METHOD OF GRAPHENE ELECTRODE AND LIQUID CRYSTAL DISPLAY PANEL FOR REDUCING DIFFICULTY OF PATTERNING GRAPHENE

(71) Applicant: Shenzhen China Star Optoelectronics Technology Co., Ltd., Shenzhen, Guangdong (CN)

(72) Inventor: Haijun Wang, Guangdong (CN)

(73) Assignee: TCL China Star Optoelectronics Technology Co., Ltd., Shenzhen, Guangdong (CN)

( * ) Notice: Subject to any disclaimer, the term of this patent is extended or adjusted under 35 U.S.C. 154(b) by 51 days.

(21) Appl. No.: 15/535,699

(22) PCT Filed: Apr. 24, 2017

(86) PCT No.: PCT/CN2017/081721
§ 371 (c)(1),
(2) Date: Jun. 13, 2017

(87) PCT Pub. No.: WO2018/188115
PCT Pub. Date: Oct. 18, 2018

(65) Prior Publication Data
US 2018/0364513 A1    Dec. 20, 2018

(30) Foreign Application Priority Data

Apr. 10, 2017 (CN) .......................... 2017 1 0231232

(51) Int. Cl.
*G02F 1/1343* (2006.01)
*C01B 32/184* (2017.01)
(Continued)

(52) U.S. Cl.
CPC ........ *G02F 1/13439* (2013.01); *C01B 32/182* (2017.08); *C01B 32/184* (2017.08);
(Continued)

(58) Field of Classification Search
CPC combination set(s) only.
See application file for complete search history.

(56) References Cited

U.S. PATENT DOCUMENTS 6,500,276 B1 * 12/2002 Minevski ............... C23C 22/40
106/14.21
2011/0013130 A1 * 1/2011 Choi ................. G02F 1/134363
349/141
(Continued)

FOREIGN PATENT DOCUMENTS

| CN | 102719877 A | 10/2012 |
|---|---|---|
| CN | 106409667 A | 2/2017 |
| KR | 20160101841 A | 8/2016 |

*Primary Examiner* — Lauren Nguyen
(74) *Attorney, Agent, or Firm* — Andrew C. Cheng

(57) ABSTRACT

The present invention discloses a manufacturing method of a graphene electrode. In the manufacturing method of the present invention, a carbon source which is patterned is formed on the metal substrate with photoresist, or as metal layer which is patterned is formed on the carbon source. The metal substrate or metal layer after heating is used to catalyze the carbon source in direct contact therewith into graphene, and thus to form the graphene which is patterned to be used as a graphene electrode which is patterned in a display device. Apparently, the manufacturing method of the graphene electrode according to the present invention can simplify the manufacturing process and can reduce the difficulty of patterning the graphene electrode and the processing cost. The present invention further provides a liquid crystal display panel, comprising the graphene electrode manufactured by the foregoing method.

7 Claims, 5 Drawing Sheets

(51) Int. Cl.
*C01B 32/182* (2017.01)
*C01B 32/186* (2017.01)
*C01B 32/198* (2017.01)

(52) U.S. Cl.
CPC .......... *C01B 32/186* (2017.08); *G02F 1/1343* (2013.01); *G02F 1/134309* (2013.01); *C01B 32/198* (2017.08); *G02F 2202/02* (2013.01)

(56) References Cited

U.S. PATENT DOCUMENTS

| | | | |
|---|---|---|---|
| 2012/0241069 A1* | 9/2012 | Hofmann | B82Y 30/00 |
| | | | 156/60 |
| 2013/0149463 A1* | 6/2013 | Zhang | C23C 18/06 |
| | | | 427/552 |
| 2014/0077161 A1* | 3/2014 | Duan | B82Y 10/00 |
| | | | 257/29 |

* cited by examiner

MANUFACTURING METHOD OF GRAPHENE ELECTRODE AND LIQUID CRYSTAL DISPLAY PANEL FOR REDUCING DIFFICULTY OF PATTERNING GRAPHENE

CROSS REFERENCE

This application claims the priority of Chinese Patent Application No. 201710231232.1, entitled "Manufacturing method of graphene electrode and liquid crystal display panel", filed on Apr. 10, 2017, the disclosure of which is incorporated herein by reference in its entirety.

FIELD OF THE INVENTION

The present invention relates to a manufacturing method of an electrode, and more particularly to a manufacturing method of a graphene electrode and a liquid crystal display panel.

BACKGROUND OF THE INVENTION

Graphene is stripped from the graphite material and is a two-dimensional crystal composed of carbon atoms with only one layer of atomic thickness. Graphene is currently the thinnest material and is the material having the highest intensity in nature, and has a extremely high thermal conductivity. The excellent thermal conductivity makes graphene be expected as a cooling material of the future of ultra-large-scale nano-integrated circuit. In addition, the stable lattice structure of graphene makes it possess an excellent conductivity. Because the graphene has the excellent performance, it has been widely used in industry. For instance, it is applied in a display device, and is used as a graphene electrode.

At present, the manufacture of graphene electrode mainly is: usage of the transfer method, which specifically is: transferring the graphene onto the target substrate, and etching the graphene by micromachining, thereby forming a preset pattern; or, preparing the patterned metal material in advance, and forming the graphene on the metal pattern by chemical vapor deposition (CVD), and then transferring the same onto the target substrate. Although the method according to prior art can manufacture the graphene electrode of particular pattern, the manufacturing process is complicated, and the quality of the graphene is lower. Moreover, the aforesaid method makes the graphene electrode patterning more difficult and the cost is higher. Therefore, there is a need to develop a new manufacturing method of a graphene electrode so that it is more widely used in the field of electronic devices.

SUMMARY OF THE INVENTION

The embodiment of the present invention provides a manufacturing method of a graphene electrode, which can simplify the manufacturing process and can reduce the difficulty of patterning the graphene electrode to decrease the processing cost in advance.

First, the embodiment of the present invention provides a manufacturing method of a graphene electrode, comprising steps of:

providing a metal substrate, and forming a photoresist layer on the metal substrate;

providing a mask, and exposing the photoresist layer with the mask;

developing the photoresist layer after exposure to form the photoresist layer which is patterned on the metal substrate;

forming a carbon source on the metal substrate covered with the photoresist layer which is patterned, and a portion of the carbon source covering on the photoresist layer which is patterned, and the other portion directly covering on the metal substrate not covered by the photoresist layer which is patterned;

heating the metal substrate under an inactive gas protection to catalyze the carbon source directly covering on the metal substrate by the metal substrate to form graphene;

stripping the photoresist layer which is patterned and the carbon source covering on the photoresist layer which is patterned from the metal substrate, and the graphene directly covering on the metal substrate forming the graphene which is patterned;

providing a target substrate, and transferring the graphene which is patterned on the target substrate to form the graphene electrode which is patterned on the target substrate.

Before the step of providing the metal substrate, and forming the photoresist layer on the metal substrate, the method further comprises: removing oxide on a surface of the metal substrate.

A pattern of the mask is matched with a pattern required for correspondingly manufacturing the graphene electrode; the target substrate is a flexible substrate manufactured by polyethylene terephthalate or polyimide; the metal substrate is manufactured by platinum, ruthenium, iridium, copper or nickel.

The carbon source comprises at least one of: amorphous carbon, polymethylmethacrylate, polycyclic aromatic hydrocarbon, flake graphite powder, C60 and graphite-like; a method of forming the carbon source on the metal substrate covered with the photoresist layer which is patterned comprises at least one of: magnetron sputtering, chemical vapor deposition, direct coating of graphite powder and coating of carbon atoms containing solution.

The step of providing a target substrate, and transferring the graphene which is patterned on the target substrate to form the graphene electrode which is patterned on the target substrate comprises:

providing the target substrate to adhere the target substrate on the graphene which is patterned, and heating and pressing to adhere the target substrate to the graphene which is patterned;

removing the target substrate, and maintaining the graphene which is patterned to be adhered on the target substrate to form the graphene electrode which is patterned.

Second, the embodiment of the present invention further provides a manufacturing method of a graphene electrode, comprising steps of:

providing a substrate, and forming a carbon source on the substrate;

forming a photoresist layer on the carbon source;

providing a mask, and exposing the photoresist layer with the mask;

developing the photoresist layer after exposure to form the photoresist layer which is patterned on the carbon source;

forming a metal layer on the substrate, which is covered with the carbon source and the photoresist layer which is patterned in order, and a portion of the metal layer covering on the photoresist layer which is patterned, and the other portion directly covering on the carbon source not covered by the photoresist layer which is patterned;

stripping the photoresist layer which is patterned and the metal layer covering on the photoresist layer which is patterned from the carbon source, and the metal layer directly covering on the carbon source forming the metal layer which is patterned;

heating the metal layer which is patterned under an inactive gas protection to catalyze the carbon source in direct contact with the metal layer which is patterned to form the graphene which is patterned on the substrate;

removing the metal layer which is patterned, and retaining the graphene which is patterned on the substrate to form the graphene electrode which is patterned.

A pattern of the mask is matched with a pattern required for correspondingly manufacturing the graphene electrode; the target substrate is a flexible substrate manufactured by polyethylene terephthalate or polyimide.

The carbon source comprises at least one of: amorphous carbon, polymethylmethacrylate, polycyclic aromatic hydrocarbon, flake graphite powder, C60 and graphite-like; a method of forming the carbon source on the metal substrate covered with the photoresist layer which is patterned comprises at least one of: magnetron sputtering, chemical vapor deposition, direct coating of graphite powder and coating of carbon atoms containing solution.

A method of forming the metal layer on the substrate covered with the photoresist layer which is patterned comprises at least one of: vapor deposition, evaporation and magnetron sputtering coating; a material of the metal layer comprises at least one of: platinum, ruthenium, iridium, copper and nickel.

Third, the embodiment of the present invention further provides a liquid crystal display panel, comprising a graphene electrode, and the graphene electrode is manufactured by the foregoing method.

The manufacturing method of the graphene electrode and the liquid crystal display panel provided in the embodiment of the present invention can simplify the manufacturing process and can reduce the difficulty of patterning the graphene electrode and the processing cost.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments. It is clear that the described embodiments are part of embodiments of the present application, but not all embodiments. Based on the embodiments of the present invention, all other embodiments to those of ordinary skill in the premise of no creative efforts obtained, should be considered within the scope of protection of the present invention.

Besides, the following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Besides, in the description of the present invention, unless with being indicated otherwise, "plurality" means two or more. In the present specification, the term "process" encompasses an independent process, as well as a process that cannot be clearly distinguished from another process but yet achieves the expected effect of the process of interest. Moreover, in the present specification, any numerical range expressed herein using "to" refers to a range including the numerical values before and after "to" as the minimum and maximum values, respectively. In figures, the same reference numbers will be used to refer to the same or like parts.

The embodiment of the present invention provides a manufacturing method of a graphene electrode and a liquid crystal display panel which can simplify the manufacturing process and can reduce the difficulty of patterning the graphene electrode and the processing cost. The detail descriptions are respectively introduced below.

Figure 1:
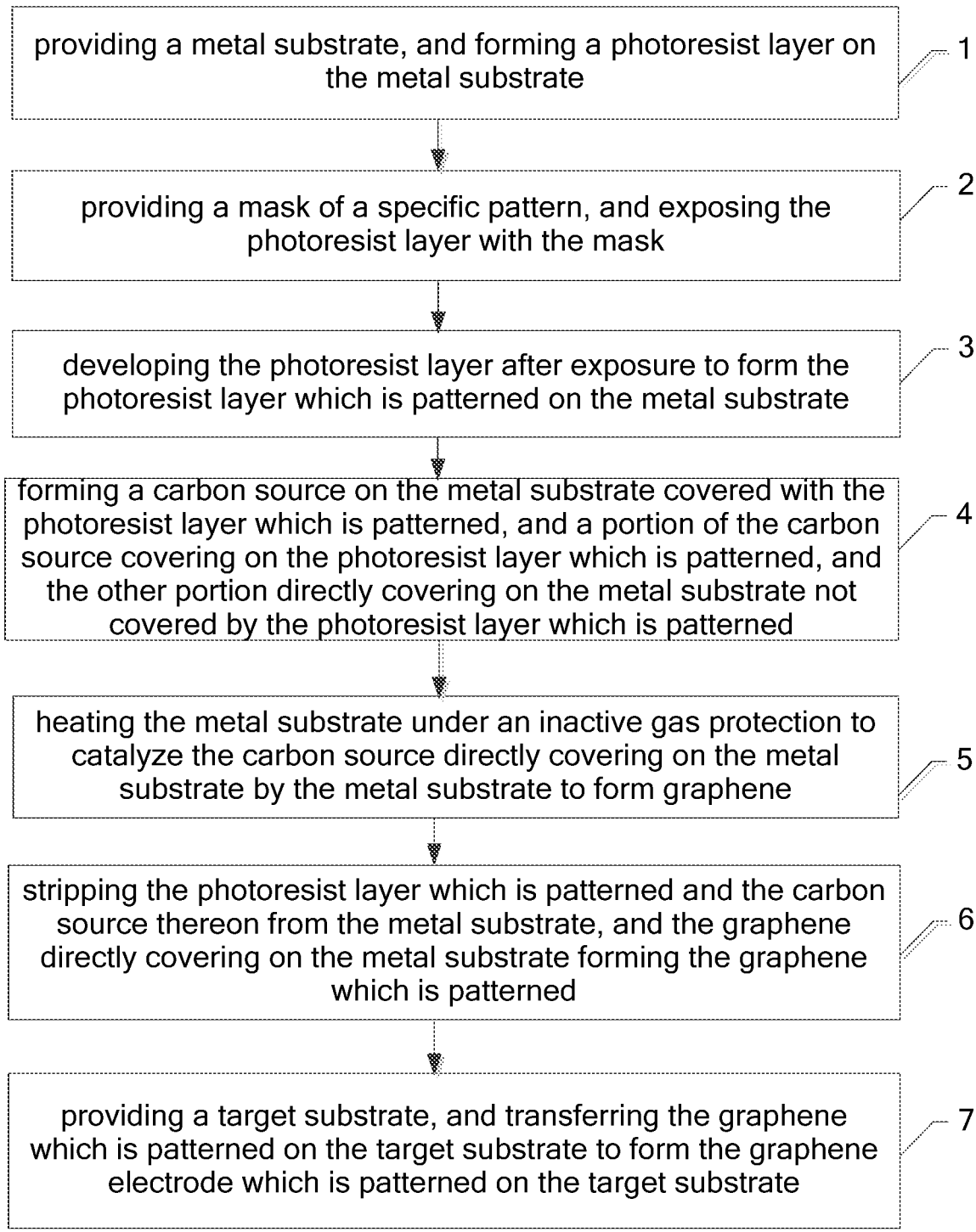
FIG. 1 is a flowchart of a manufacturing method of a graphene electrode provided by the first embodiment of the present invention.

Please refer to FIG. 1. FIG. 1 is a flowchart of a manufacturing method of a graphene electrode provided by the first embodiment of the present invention. Please refer to FIG. 2(a) to FIG. 2(h), together. FIG. 2(a) to FIG. 2(h) are process diagrams of respective steps as manufacturing the graphene electrode by the manufacturing method shown in FIG. 1. FIG. 2(a) to FIG. 2(h) respectively correspond to the respective steps of the manufacturing method of the graphene electrode shown in FIG. 1. In the embodiment of the present invention, the manufacturing method of the graphene electrode at least comprises the following steps.

step 1, providing a metal substrate, and forming a photoresist layer on the metal substrate.

In one embodiment of the present invention, the metal substrate can be a sheet or a film made of metal such as platinum, ruthenium, iridium, copper or nickel. The metal substrate is used as a catalyst to catalyze the carbon source in contact with the metal substrate to form graphene.

In one embodiment of the present invention, the type of the photoresist layer is not limited, and a positive photoresist or a negative photoresist may be selected base on needs. The photoresist layer formed of the negative photoresist is illustrated for explanation in the embodiment of the present invention.

In one embodiment of the present invention, before the step of forming the photoresist layer on the metal substrate, the method further comprises a step of: removing oxide on a surface of the metal substrate. The specific operation is: the metal substrate can be placed in a solution such as acetone, ethyl lactate or ethanol for ultrasonic cleaning.

Figure 2A:
FIG. 2(a) to FIG. 2(h) are process diagrams of respective steps as manufacturing the graphene electrode by the manufacturing method shown in FIG. 1.
Figure 2B:
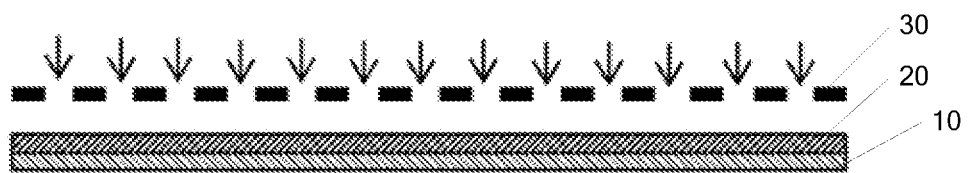

As shown in FIG. 2(a), the structure formed by step 1 forms a photoresist layer 20 on the metal substrate 10.

step 2, providing a mask, and exposing the photoresist layer with the mask.

In one embodiment of the present invention, the mask can be preliminarily set to a specific pattern according to practical requirement. Specifically, a pattern of the mask is matched with a pattern required for correspondingly manufacturing the graphene electrode. Please refer to FIG. 2(b). A mask 30 matched with the pattern required for manufacturing the graphene electrode is utilized for exposing the photoresist layer 20.

step 3, developing the photoresist layer after exposure to form the photoresist layer which is patterned on the metal substrate.

Figure 2C:
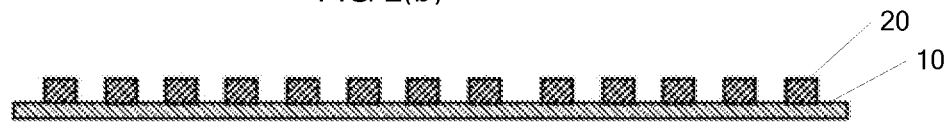

Please refer to FIG. 2(c). The light is irradiated onto the photoresist layer 20 through the mask 30. Because the photoresist layer in the embodiment of the present invention is a negative photoresist, the portion of the photoresist layer 20 irradiated with the light through the mask 30 is cured, and retained on the metal substrate 10 after development; the portion of the photoresist layer 20 covered by the mask 30 is removed after development so that only the photoresist layer 20 which is patterned is retained on the metal substrate 10.

step 4, forming a carbon source on the metal substrate covered with the photoresist layer which is patterned, and a portion of the carbon source covering on the photoresist layer which is patterned, and the other portion directly covering on the metal substrate not covered by the photoresist layer which is patterned.

In one embodiment of the present invention, the type of the carbon source is not limited, and the carbon source comprises but is not limited to at least one of: amorphous carbon, polymethylmethacrylate (PMMA), polycyclic aromatic hydrocarbon (PAHs), flake graphite powder, C60 and graphite-like. In the present invention, the type of the carbon source is not specifically defined.

In one embodiment of the present invention, the method of forming the carbon source on the metal substrate comprises but is not limited to: magnetron sputtering, chemical vapor deposition, direct coating of graphite powder and coating of carbon atoms containing solution. The method of forming the carbon source on the metal substrate in the present invention is not specifically limited.

Figure 2D:
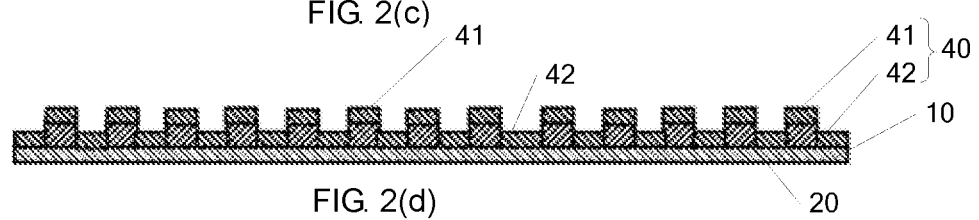

Please refer to FIG. 2(d). Since the surface of the photoresist layer 20 which is patterned retained on the metal substrate 10 has a level difference with the surface of the metal substrate 10 after the photoresist layer 20 is patterned, the carbon source 40 formed on the metal substrate 10 is also divided into two layers by the level difference, which respectively are a first layer of carbon source 41 covering on the surface of the photoresist layer 20 which is patterned and a second layer of carbon source 42 directly covering on the metal substrate 10. Meanwhile, the first layer of carbon source 41 and the second layer of carbon source 42 also have the same level difference so that the first layer of carbon source 41 and the second layer of carbon source 42 are not connected to each other.

step 5, heating the metal substrate under an inactive gas protection to catalyze the carbon source directly covering on the metal substrate by the metal substrate to form graphene.

In one embodiment of the present invention, The metal substrate after processing in step 4 is placed in a vacuum-tight chamber, and an inactive gas (such as argon) is passed while heating the metal substrate to convert the carbon source in direct contact with the metal substrate into graphene by using the metal substrate after heating to catalyze the carbon source in contact therewith. It is understood that as selecting different types of metal substrates and carbon sources, the correspondingly required heating temperature and duration are different. The required heating temperature, duration and other parameters are not specifically limited here.

In one embodiment of the present invention, the metal substrate may be heated by laser irradiation, and the method of heating the metal substrate is not limited thereto. The method of heating the metal substrate is not specifically limited here.

Figure 2E:
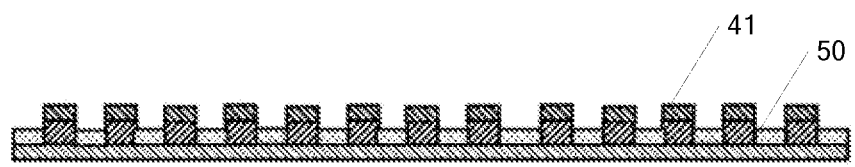

Please refer to FIG. 2(e). The carbon source in direct contact with the metal substrate 10, i.e. the carbon source (the second layer of carbon source 42), of which the surface is not covered by the photoresist layer 20 which is patterned and directly covers on the metal substrate 10 forms the graphene 50 under the catalysis of the metal substrate 10 after heating; the carbon source (the first layer of carbon source 41) covering on the photoresist layer 20 which is patterned is not in direct contact with the metal substrate 10, and thus cannot be catalyzed and remains to be carbon source.

step 6, stripping the photoresist layer which is patterned and the carbon source thereon from the metal substrate, and the graphene directly covering on the metal substrate forming the graphene which is patterned.

After step 5, the metal substrate is not only covered with the graphene catalyzed by the metal substrate, but also the photoresist layer which is patterned and the non-catalyzed carbon source on the photoresist layer. Therefore, it is necessary to remove the photoresist layer which is patterned and the carbon source thereon together from the metal substrate while retaining only the graphene on the metal substrate to form the graphene which is patterned. In one embodiment of the present invention, the photoresist layer which is patterned and the carbon source thereon may be stripped from the metal substrate by etching but the method of stripping the photoresist layer which is patterned and the carbon source thereon from the metal substrate is not limited thereto and not specifically limited.

Figure 2F:
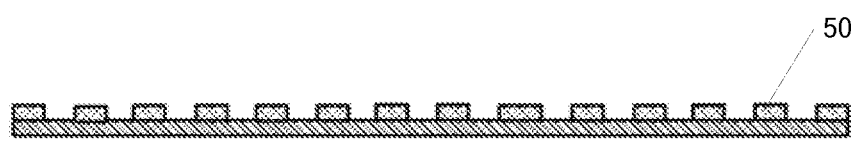

The structure formed by step 6 is shown in FIG. 2(f). As stripping the photoresist layer 20 which is patterned from the metal substrate 10, the non-catalyzed carbon source on the photoresist layer 20 which is patterned will be stripped together. Accordingly, only the graphene 50 is retained on the metal substrate 10, and the graphene 50 which is patterned is formed on the metal substrate 10.

step 7, providing a target substrate, and transferring the graphene which is patterned on the target substrate to form the graphene electrode which is patterned on the target substrate.

Since the metal substrate is only used to catalyze the carbon source into the graphene and cannot be used as a substrate for the graphene electrode in the display device, it is necessary to transfer the graphene which is patterned onto the target substrate and to form the graphene electrode which is patterned on the target substrate after forming the graphene electrode which is patterned, and the graphene electrode can be applied in the display device as the electrode of the display device.

Figure 2G:
Figure 2H:
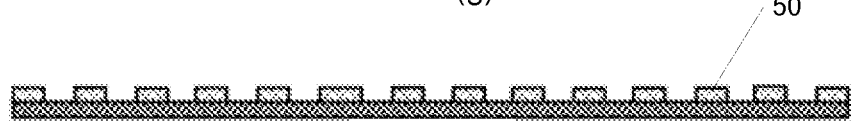

Please refer to FIG. 2(g) and FIG. 2(h). Step 7 comprises the following two steps:

step 7-1, providing the target substrate to adhere the target substrate on the graphene which is patterned, and heating and pressing to adhere the target substrate to the graphene which is patterned.

In one embodiment of the present invention, the target substrate is a substrate required for carrying the electrodes in the display device, and the adhesion force between the target substrate and the graphene which is patterned is enhanced by heating and pressing so that the target substrate and the graphene which is patterned are adhered to each other. The structure formed by step 7-1 is shown in FIG. 2(g). The target substrate 60 is adhered to the graphene 50 which is patterned.

In one embodiment of the present invention, the target substrate can be a flexible substrate manufactured by polyethylene terephthalate (PET) or polyimide (PI). The material of the target substrate is not specifically defined in the present embodiment.

step 7-2, removing the target substrate, and maintaining the graphene which is patterned to be adhered on the target substrate to form the graphene electrode which is patterned.

Since the metal substrate is only used to catalyze the carbon source in contact with graphene, the metal substrate is removed by etching after transferring the graphene which is patterned onto the target substrate, and the graphene which is patterned remains being adhered to the target substrate to form a graphene electrode which is patterned to be used as the electrode in the display device. The structure formed by step 7-2 is shown in FIG. 2(h).

The manufacturing method of the graphene electrode according to this embodiment forms the carbon source which is patterned on the metal substrate with the photoresist technology to catalyze the carbon source which is patterned into the graphene which is patterned by the metal catalysis and to transfer the graphene which is patterned onto the target substrate for forming the graphene electrode which is patterned on the target substrate, and the graphene electrode which is patterned is used as a graphene electrode applied in the display device. Apparently, the manufacturing method of the graphene electrode according to this embodiment does not only simplify the manufacturing process but also reduce the difficulty of patterning the graphene electrode to tremendously reduce the processing cost.

Figure 3:
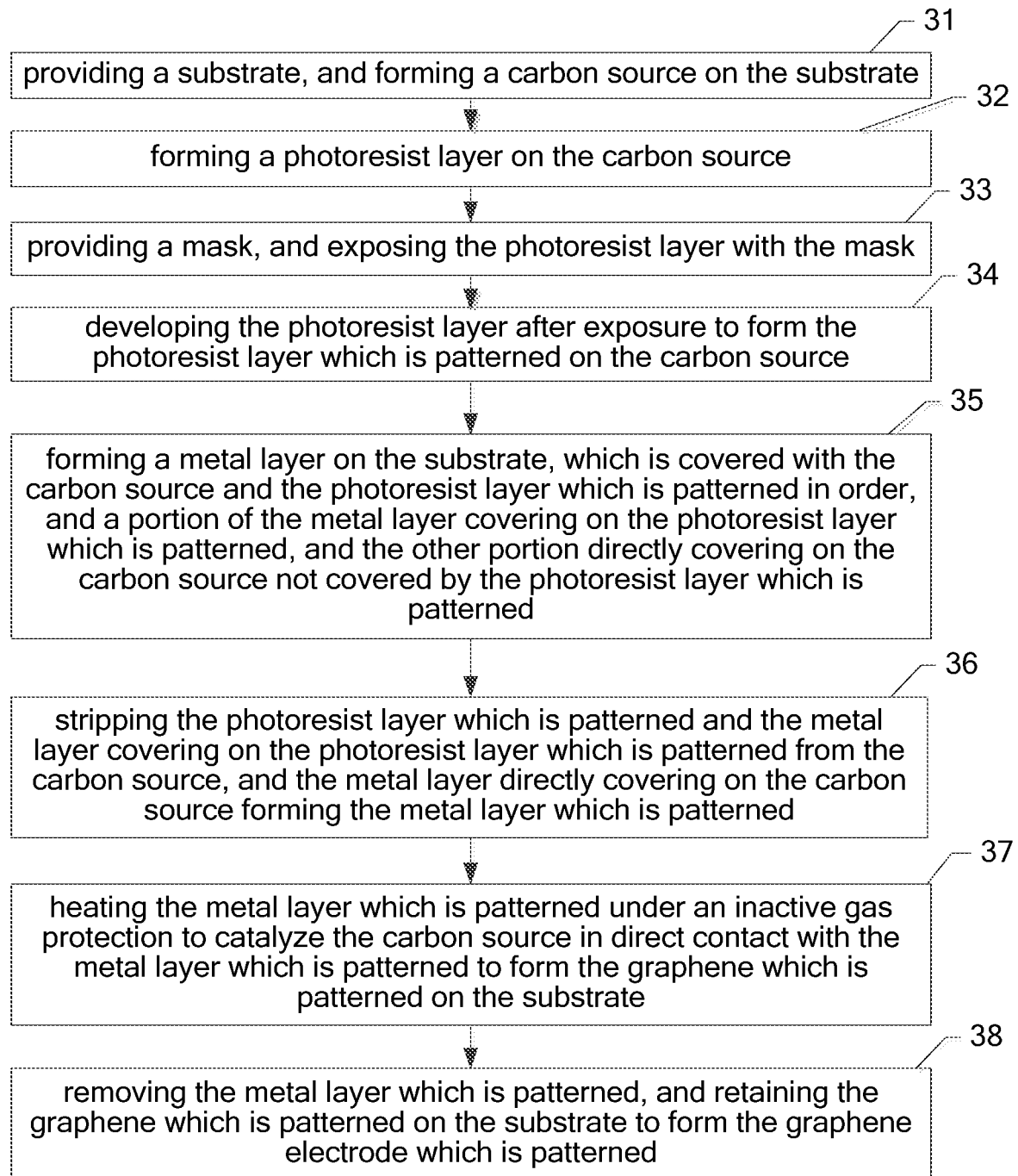
FIG. 3 is a flowchart of a manufacturing method of a graphene electrode provided by the second embodiment of the present invention.

Please refer to FIG. 3. FIG. 3 is a flowchart of a manufacturing method of a graphene electrode provided by the second embodiment of the present invention. Please refer to FIG. 4(a) to FIG. 4(h), together. FIG. 4(a) to FIG. 4(h) are process diagrams of respective steps as manufacturing the graphene electrode by the manufacturing method shown in FIG. 3. FIG. 4(a) to FIG. 4(h) respectively correspond to the respective steps of the manufacturing method of the graphene electrode shown in FIG. 3. In the embodiment of the present invention, the manufacturing method of the graphene electrode at least comprises the following steps.

step 31, providing a substrate, and forming a carbon source on the substrate.

In one embodiment of the present invention, the substrate can be a flexible substrate manufactured by polyethylene terephthalate (PET) or polyimide (PI). The material of the substrate is not specifically defined in the present invention.

In one embodiment of the present invention, the type of the carbon source is not limited, and the carbon source comprises but is not limited to at least one of: amorphous carbon, polymethylmethacrylate (PMMA), polycyclic aromatic hydrocarbon (PAHs), flake graphite powder, C60 and graphite-like. In the present invention, the type of the carbon source is not specifically defined.

In one embodiment of the present invention, the method of forming the carbon source on the metal substrate comprises but is not limited to: magnetron sputtering, chemical vapor deposition, direct coating of graphite powder and coating of carbon atoms containing solution. The method of forming the carbon source on the metal substrate in the present invention is not specifically limited.

Figure 4A:
FIG. 4(a) to FIG. 4(h) are process diagrams of respective steps as manufacturing the graphene electrode by the manufacturing method shown in FIG. 3.

The structure formed by step 31 is shown in FIG. 4(a). A layer of carbon source 200 is formed on the substrate 100.

step 32, forming a photoresist layer on the carbon source.

Figure 4B:
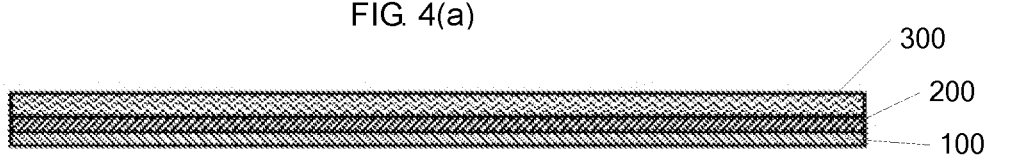
Figure 4C:
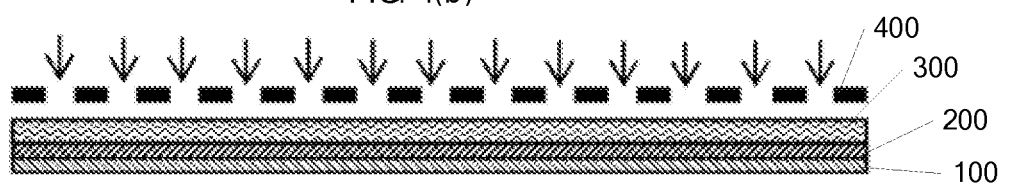

In one embodiment of the present invention, the type of the photoresist layer is not limited, and a positive photoresist or a negative photoresist may be selected base on needs. The photoresist layer formed of the negative photoresist is illustrated for explanation in the embodiment of the present invention. Please refer to FIG. 4(b). The structure after step 32 is shown in FIG. 4(b). A photoresist layer 300 is formed on the carbon source 200.

step 33, providing a mask, and exposing the photoresist layer with the mask.

In one embodiment of the present invention, the mask can be preliminarily set to a specific pattern according to practical requirement. Specifically, a pattern of the mask is matched with a pattern required for correspondingly manufacturing the graphene electrode. Please refer to FIG. 4(c). A mask 400 matched with the pattern required for manufacturing the graphene electrode is utilized for exposing the photoresist layer 300.

step 34, developing the photoresist layer after exposure to form the photoresist layer which is patterned on the carbon source.

Figure 4D:
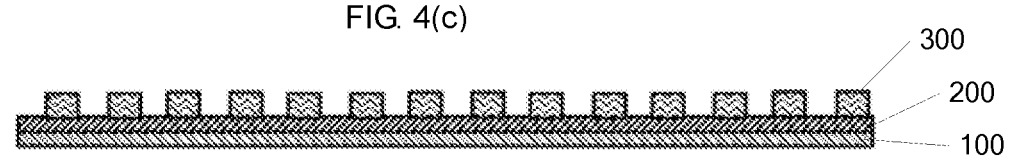

Please refer to FIG. 4(d). The light is irradiated onto the photoresist layer 300 through the mask 400. Because the photoresist layer in the embodiment of the present invention is a negative photoresist, the portion of the photoresist layer 300 irradiated with the light through the mask 400 is cured, and retained on the carbon source 200 after development; the portion of the photoresist layer 300 covered by the mask 400 is removed after development, and the carbon source 200 on the substrate 100 is revealed to form the photoresist layer 300 which is a patterned on the carbon source 200.

step 35, forming a metal layer on the substrate, which is covered with the carbon source and the photoresist layer which is patterned in order, and a portion of the metal layer covering on the photoresist layer which is patterned, and the other portion directly covering on the carbon source not covered by the photoresist layer which is patterned.

In one embodiment of the present invention, the material of the metal layer comprises but is not limited there to at least one of: platinum, ruthenium, iridium, copper and nickel. The metal substrate is used as a catalyst to catalyze the carbon source in contact with the metal substrate to form graphene in a heated state. In the present embodiment, the material of the metal layer is not specifically defined.

In one embodiment of the present invention, the metal layer can be formed by vapor deposition, evaporation and magnetron sputtering coating, and the processing method of the metal layer is not specifically defined in the present invention.

Figure 4E:
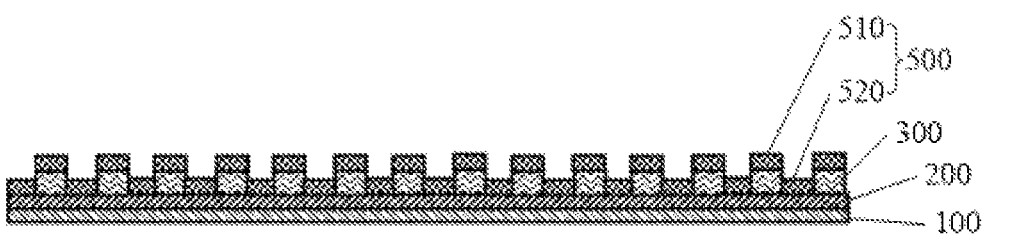

Please refer to FIG. 4(e). Since the surface of the photoresist layer 300 which is patterned retained on the carbon source 200 has a level difference with the surface of the carbon source 200 after the photoresist layer 300 is patterned, the metal layer 500 formed on the photoresist layer 300 which is patterned is also divided into two layers by the level difference, which respectively are a first metal layer 510 covering on the surface of the photoresist layer 300 which is patterned and a second metal layer 520 directly covering on the carbon source 200. Meanwhile, the first metal layer 510 and the second metal layer 520 also have the same level difference so that the first metal layer 510 and the second metal layer 520 are not connected to each other.

step 36, stripping the photoresist layer which is patterned and the metal layer covering on the photoresist layer which is patterned from the carbon source, and the metal layer directly covering on the carbon source forming the metal layer which is patterned.

After step 35, the carbon source is not only covered with the metal layer (the second metal layer) which is patterned, but also the photoresist layer which is patterned and the metal layer (the first metal layer) covering on the photoresist layer which is patterned. Since only the portion of the carbon source in direct contact with the metal can be catalyzed into graphene, and the portion not in direct contact with the metal cannot be catalyzed into graphene. Therefore, in the manufacturing method according to one embodiment of the present invention, only the metal layer which is patterned in direct contact with the carbon source needs to be retained, and the photoresist layer which is patterned and the metal layer on the surface of the photoresist layer which is patterned is removed for catalyzing the carbon source in contact with the retained metal layer which is patterned into the graphene which is patterned.

In one embodiment of the present invention, the photoresist layer which is patterned and the metal layer thereon may be stripped from the carbon source by etching but the method of stripping the photoresist layer which is patterned and the metal layer from the carbon source is not limited thereto and not specifically limited.

Figure 4F:
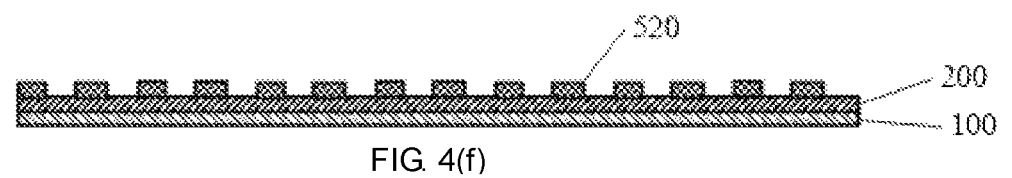

Please refer to FIG. 4(f). As stripping the photoresist layer 300 which is patterned from the carbon source 200, the metal layer (the first metal layer 510) on the photoresist layer 300 which is patterned will be stripped together. Accordingly, only the metal layer (the second metal layer 520) which is patterned is retained on the carbon source 200.

step 37, heating the metal layer which is patterned under an inactive gas protection to catalyze the carbon source in direct contact with the metal layer which is patterned to form the graphene which is patterned on the substrate.

In one embodiment of the present invention, The substrate after processing in step 36 is placed in a vacuum-tight chamber, and an inactive gas (such as argon) is passed while heating the metal layer which is patterned to catalyze the carbon source in direct contact with the metal layer which is patterned to convert the carbon source in direct contact with the metal layer which is patterned into graphene, and the pattern of the graphene is the same as the pattern of the metal layer which is patterned to form the graphene which is patterned on the substrate. It is understood that as selecting different types of metal layers and carbon sources, the parameters, such as the correspondingly required heating temperature and the duration are different. The required heating temperature, duration and other parameters are not specifically limited here.

In one embodiment of the present invention, the metal layer may be heated by laser irradiation, and the method of heating the metal layer is not limited thereto. The method of heating the metal layer is not specifically limited here.

Figure 4G:
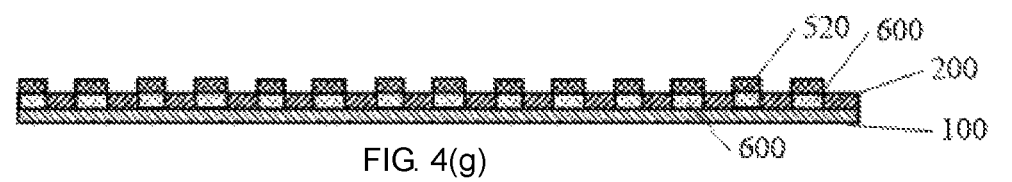

Please refer to FIG. 4(g). The metal layer (the second metal layer 520) which is patterned and covers on the carbon source 200 is heated to catalyze the carbon source 200 in direct contact therewith to form the graphene 600 which is patterned; the carbon source 200 not covered by the metal layer 510 which is patterned cannot be catalyzed by the metal layer and remains to be carbon source but can be used as an insulation layer because of being not in direct contact with the metal layer 500.

step 38, removing the metal layer which is patterned, and retaining the graphene which is patterned on the substrate to form the graphene electrode which is patterned.

Figure 4H:
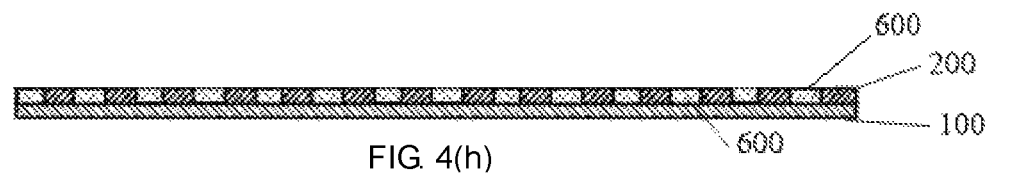

Since the metal layer which is patterned is only used to catalyze the carbon source into graphene, the metal layer which is patterned is removed by etching after catalyzing and forming the graphene which is patterned, and the graphene which is patterned is retained on the substrate to form a graphene electrode which is patterned on the substrate, and the graphene electrode which is patterned can be used as the electrode in the display device. The structure formed by step 38 is shown in FIG. 4(h). The graphene 600 which is patterned is formed on the substrate 100. The graphene 600 which is patterned is used as a graphene electrode which is patterned in a display device. The carbon source 200 which is not in contact with the metal layer 500 remains a non-conductive carbon source structure to be an insulation layer.

The manufacturing method of the graphene electrode according to this embodiment forms the metal layer which is patterned on the carbon source with the photoresist technology to catalyze the carbon source in direct contact into the graphene which is patterned by the metal layer which is patterned. The graphene which is patterned can be carried on the substrate to be the graphene electrode which is patterned and applied in the display device. Apparently, the manufacturing method of the graphene electrode according to this embodiment does not only simplify the manufacturing process but also reduce the difficulty of patterning the graphene electrode to tremendously reduce the processing cost.

The present invention further provides a liquid crystal display panel. The electrode in the liquid crystal display panel is a graphene electrode, and the graphene electrode is manufactured by the foregoing method.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

The detail description has been introduced above for the manufacturing method of the graphene electrode and the liquid crystal display panel provided by the embodiment of the invention. Herein, a specific case is applied in this article for explain the principles and specific embodiments of the present invention have been set forth. The description of the aforesaid embodiments is only used to help understand the method of the present invention and the core idea thereof;

meanwhile, for those of ordinary skill in the art, according to the idea of the present invention, there should be changes either in the specific embodiments and applications but in sum, the contents of the specification should not be limitation to the present invention.

What is claimed is:

1. A manufacturing method of a graphene electrode, comprising steps of:
    providing a metal substrate, and removing oxide on a surface of the metal substrate in a solution of acetone, ethyl lactate or ethanol for ultrasonic cleaning, and then forming a photoresist layer on the surface of the metal substrate;
    providing a mask, and exposing the photoresist layer with the mask;
    developing the photoresist layer after exposure to form the photoresist layer which is patterned on the metal substrate;
    forming a carbon source on the metal substrate covered with the photoresist layer which is patterned, and a portion of the carbon source covering on the photoresist layer which is patterned, and the other portion directly covering on the metal substrate not covered by the photoresist layer which is patterned, wherein the carbon source is a non-gaseous material that is formed as a film on the metal substrate covered with the photoresist layer which is patterned so as to form an intermediate substrate, in which the portion of the carbon source covering on the photoresist layer and the other portion directly covering and in direct contact with the metal substrate have a level difference therebetween and are not connected to each other;
    placing the intermediate substrate on which said other portion of the carbon source that covers the metal substrate is carried in a vacuum-tight chamber and filling an inactive gas, and then heating the metal substrate under protection of the inactive gas to catalyze the carbon source directly covering and in direct contact with the metal substrate by the metal substrate to form graphene, while heating is not transferred to the portion of the carbon source covering the photoresist layer by the level difference;
    stripping the photoresist layer which is patterned and the carbon source covering on the photoresist layer which is patterned from the metal substrate, and the graphene directly covering on the metal substrate forming the graphene which is patterned;
    providing a target substrate, and transferring the graphene which is patterned on the target substrate to form the graphene electrode which is patterned on the target substrate.

2. The manufacturing method of the graphene electrode according to claim 1, wherein a pattern of the mask is matched with a pattern required for correspondingly manufacturing the graphene electrode; the target substrate is a flexible substrate manufactured by polyethylene terephthalate or polyimide; the metal substrate is manufactured by platinum, ruthenium, iridium, copper or nickel.

3. The manufacturing method of the graphene electrode according to claim 1, wherein the carbon source comprises at least one of: amorphous carbon, polymethylmethacrylate, polycyclic aromatic hydrocarbon, flake graphite powder, C60 and graphite-like; a method of forming the carbon source on the metal substrate covered with the photoresist layer which is patterned comprises at least one of: magnetron sputtering, chemical vapor deposition, direct coating of graphite powder and coating of carbon atoms containing solution.

4. The manufacturing method of the graphene electrode according to claim 1, wherein the step of providing a target substrate, and transferring the graphene which is patterned on the target substrate to form the graphene electrode which is patterned on the target substrate comprises:
    providing the target substrate to adhere the target substrate on the graphene which is patterned, and heating and pressing to adhere the target substrate to the graphene which is patterned;
    removing the target substrate, and maintaining the graphene which is patterned to be adhered on the target substrate to form the graphene electrode which is patterned.

5. The manufacturing method of the graphene electrode according to claim 1, wherein the step of providing a target substrate, and transferring the graphene which is patterned on the target substrate to form the graphene electrode which is patterned on the target substrate comprises:
    providing the target substrate to adhere the target substrate on the graphene which is patterned, and heating and pressing to adhere the target substrate to the graphene which is patterned;
    removing the target substrate, and maintaining the graphene which is patterned to be adhered on the target substrate to form the graphene electrode which is patterned.

6. The manufacturing method of the graphene electrode according to claim 2, wherein the step of providing a target substrate, and transferring the graphene which is patterned on the target substrate to form the graphene electrode which is patterned on the target substrate comprises:
    providing the target substrate to adhere the target substrate on the graphene which is patterned, and heating and pressing to adhere the target substrate to the graphene which is patterned;
    removing the target substrate, and maintaining the graphene which is patterned to be adhered on the target substrate to form the graphene electrode which is patterned.

7. The manufacturing method of the graphene electrode according to claim 3, wherein the step of providing a target substrate, and transferring the graphene which is patterned on the target substrate to form the graphene electrode which is patterned on the target substrate comprises:
    providing the target substrate to adhere the target substrate on the graphene which is patterned, and heating and pressing to adhere the target substrate to the graphene which is patterned;
    removing the target substrate, and maintaining the graphene which is patterned to be adhered on the target substrate to form the graphene electrode which is patterned.

* * * * *